United States Patent [19]

Soldatos

[11] Patent Number: 4,720,303

[45] Date of Patent: Jan. 19, 1988

[54] THICKENING AGENTS AND THE MANUFACTURE AND USE THEREOF

[75] Inventor: Anthony C. Soldatos, New York, N.Y.

[73] Assignee: BP Chemicals Limited, London, England

[21] Appl. No.: 928,668

[22] Filed: Nov. 6, 1986

Related U.S. Application Data

[63] Continuation of Ser. No. 768,946, Aug. 23, 1985, abandoned.

[30] Foreign Application Priority Data

Aug. 29, 1984 [GB] United Kingdom ............... 8421827

[51] Int. Cl.$^4$ ............................ C09K 7/00; C08L 1/08
[52] U.S. Cl. ............................... 106/181; 252/8.51; 524/43; 524/44
[58] Field of Search ............... 106/181, 194; 252/8.51; 524/44, 43

[56] References Cited

U.S. PATENT DOCUMENTS

| | | | |
|---|---|---|---|
| 4,050,943 | 9/1977 | Sondhe | 106/187 |
| 4,184,888 | 1/1980 | Zoumut | 106/178 |
| 4,415,683 | 11/1983 | Kernstock | 524/43 |
| 4,502,867 | 3/1985 | Reinhardt | 8/558 |
| 4,597,797 | 1/1986 | Roorda et al. | 106/194 |

FOREIGN PATENT DOCUMENTS 077158  9/1986  European Pat. Off. ............ 106/181

*Primary Examiner*—Theodore Morris
*Attorney, Agent, or Firm*—Brooks Haidt Haffner & Delahunty

[57] ABSTRACT

A thickening agent suitable for thickening carpet backing formulations, paints and drilling muds is provided. The thickening agent comprises (1) a cellulose ether and (2) a solid acid for example citric acid, tartaric acid, oxalic acid, malonic acid, succinic acid and polyacrylic acid.

12 Claims, No Drawings

THICKENING AGENTS AND THE MANUFACTURE AND USE THEREOF

This application is a continuation of application Ser. No. 768,946, filed Aug. 23, 1985, now abandoned.

The present invention relates to improved cellulose ether based thickeners which find application as thickening agents and a process for the manufacture thereof.

Cellulose ethers find wide application as thickening agents in a variety of products for example paints. Such materials thicken solutions because, on dispersion, the cellulose ether molecules interact with the solvent molecule to produce a gel-like phase which is more viscous than the original solvent.

A major problem with the use of cellulose ethers is the problem of agglomeration or lump formation. Unless great care is taken when the cellulose ether is dissolved in the solvent, local gel formation can occur around particles of undissolved cellulose ether. The gel thus formed prevents water from coming into contact with the cellulose ether molecules inside the particles leading to the formation of lumps which then dissolve very slowly. Obviously for most applications lump formation is undesirable as it is usually necessary to produce marketable products which are of even consistency. Furthermore, such lumps lower the thickening efficiency of the product.

A method which reduces the problem of lump formation is disclosed in U.S. Pat. No. 2,379,268. By contacting the cellulose ether with certain dialdehydes, in particular glyoxal, it is found that the tendency of the cellulose ether towards agglomeration and lump formation is significantly reduced. The dialdehyde appears to react with molecules of the cellulose ether in a reaction which crosslinks these molecules by the formation of hemiacetal linkages and converts them into a form which is more easily dispersed in an aqueous solvent. Once in solution, the water slowy hydrolyses the crosslinkages and regenerates the cellulose ether in a form which is now evenly dispersed. Gel formation then occurs in an even and controlled way leading to products which are thickened evenly.

The rate at which the cellulose ether is regenerated from the crosslinked form is characterised by the hydration time. Crosslinked formulations with short hydration time hydrolyse and thus thicken aqueous solvents rapidly while those with long hydration times hydrolyse and thicken said solvents slowly. In general crosslinked cellulose ethers should have sufficiently long hydration times to allow smooth dispersion of the said material into the solvent but also have a sufficiently short hydration time to allow thickening to occur within a reasonable time.

The main drawback of the crosslinking method described above is that it has a lack of flexibility. For a given cellulose ether the hydration time can only be increased by increasing the number of crosslinkages and hence the amount of glyoxal used. Furthermore, because the crosslinking reaction between the cellulose ether and the glyoxal is catalysed by acid, it is necessary to increase the quantity of acid used in order to increase the amount of crosslinking during an equivalent reaction time. Unfortunately, the use of extra acid can adversely effect the final properties of the crosslinked cellulose ether.

A second drawback that cellulose ethers crosslinked by glyoxal or other aldehydes have is that they show poor dispersibility in an alkaline environment. Because the hydrolysis of the crosslinked cellulose ether is base catalysed, the hydration times of such materials in alkaline media, for example as found in compounded carpet latices, cements, drilling fluids and pigment grinds, can be so short that lump formation again becomes a problem.

A cellulose ether based thickening agent has now been discovered which can be easily dispersed in alkaline media thereby enhancing the viscosity of the media without lump formation.

Accordingly the present invention provides a thickening agent which can be used to thicken acid, neutral or alkaline media characterised in that the thickening agent comprises (1) a cellulose ether
(2) a solid acid.

As regards component (1), this can be any or cellulose ether for example hydroxyethyl cellulose and the like. The cellulose ether component may optionally be crosslinked with a reactive dialdehyde, for example glyoxal.

The solid acid is suitably a solid organic acid and is preferably a solid which can be prepared in finely powdered form, e.g. by grinding. Conveniently the solid organic acid is a carboxylic acid, functionalised carboxylic acid or polycarboxylic acid. Preferred acids are citric acid, tartaric acid, oxalic acid, malonic acid, succinic acid, polyacrylic acid and the like.

The relative amounts of the two components may be varied over a wide range and the actual amounts will depend on the strength of the acid, its molecular weight and the alkalinity of the material to be thickened. By varying the acid and its level in the thickening agent, it is possible to tailor the thickening agent to give the best performance for a given application. Conveniently the acid cosntitutes between 0.1 and 50% by weight of the total weight of thickening agent and is preferably in the range 1–15% by weight.

It is a feature of the present thickening agents that they contain an acid which is a solid at room temperature and that the thickening agent is a mixture of solids. Although it should not be construed as limiting the present invention, it is thought that, when added to the medium to be thickened, the solid organic acid first slowly dissolves in the medium in a way such that there are regimes of high concentrations of solubilised acid near the cellulose ether particles. These regimes facilitate the adsorption of the acid onto these particles which eventually become coated with a sheath of acid. The sheath of acid effectively repels other such coated particles and thus prevents agglomeration and the subsequent formation of lumps.

When a liquid acid is used in place of a solid acid, however, the liquid acid mixes so rapidly with the medium that no regimes of high acid concentration are produced. As a consequence the adsorption of the acid onto the cellulose/cellulose ether particles is slow and in practice lump formation occurs before any acid sheath is formed.

Three important uses of such thickening agents are in the thickening of carpet backing compounds and the thickening of drilling muds and the thickening of paints.

Accordingly there is provided three further embodiments of the invention. In the first, a process for the thickening of carpet backing compounds comprise adding to the carpet backing compound sufficient of a thickener described herein to produce a homogeneous mixture of the desired viscosity.

In the second, a process for the thickening of drilling muds comprises adding to the drilling mud sufficient of a thickener described herein to produce a homogeneous mixture of the desired viscosity.

In the third application there is provided a process for the thickening of paint formulations which comprise adding to the paint formulation a thickening agent as described above.

As regards the first application suitable carpet backing compounds include dispersions of latex in aqueous solutions. Such compounds may also contain other additives known in the art such as a dispersant. Preferably the carpet backing compound is one having a pH greater than 7.

The thickening agent can also be used to thicken drilling muds and paint formulations. The composition of such materials are often proprietory and hence kept secret. However the skilled man will be able to determine which materials can be used with the thickening agent. Again it is preferably that the drilling mud or paint formulation has a pH greater than 7.

In the above applications the level of thickening agent used will depend on the desired final viscosity of the product. However, the amount of thickening agent used is suitably less than 10% by weight of the total and is preferably less than 5% by weight.

The invention is now illustrated by the following Examples.

EXAMPLE 1

This example illustrates the preparation of the thickening agent.

Citric acid was ground down until it became a finely divided, free flowing, white solid. 60 g of the group citric acid was then placed in a blender along with 940 g of Cellobond HEC 100'000 A(HEC=hydroxy ethyl cellulose) powder. The mixture was then blended until a homogeneous mixture was obtained.

EXAMPLE 2

This Example illustrates the use of the thickening agent prepared in Example 1 to thicken an alkaline carpet backing compound.

A typical carpet backing compound was blended according to the following formulation

| Latex (Polysar latex 152) | 192 parts by wt |
|---|---|
| Calcium carbonate BL200 (Omya) | 600 parts by wt |
| Sodium Metaphosphate (Dispersant) | 0.5 parts by wt |
| Water | 82 parts by wt |

To this formulation was added 0.3 parts by weight of the thickening agent. The formulation thickened evenly and full viscosity was achieved within five minutes.

Comparative Test A

To the formulation described in Example 2 was added 0.3 parts by weight of Cellobond HEC 100'000. Although the formulation was thickened, lumps were also formed creating a visible non-homogeneity.

EXAMPLE 3

A fluid used as a drilling mud (pH=9) was prepared according to the following formulation

| Calcium chloride | 50 lbs |
|---|---|
| Glutaraldehyde | 0.015 lbs |
| Myanit (0–30) | 20 lbs |
| Sodium hydroxide | 0.04 lbs | in 1 bbl of sea water. Addition of 1.51 lbs of the thickening agent caused the fluid to thicken easily and evenly to the desired viscosity.

Comparative Test B

Example 3 was followed except that 1.51 lbs of Cellobond HEC 100'000 was added to the fluid. The fluid did not thicken evenly and contained lumps which could not be easily dispersed.

EXAMPLE 4

This Example illustrates the preparation of the thickening agent. Solid polyacrylic acid (molecular weight=2000) was ground down until it became a finely divided, free flowing, white solid. 100 g of the polyacrylic acid was placed in a blender along with 100 g of Cellobond HEC 100'000A powder. The mixture was then blended until a homogeneous mixture was obtained.

EXAMPLE 5

This Example illustrates the use of the thickening agent prepared in Example 4 to thicken an alkaline carpet backing compound. A typical carpet backing compound was blended according to the following formulation:

| Latex (Dow DL 852) | 159 parts by wt |
|---|---|
| Calcium carbonate BL 200 (OMYA) | 660 parts by wt |
| Dispex N 40 (Dispersant) | 3 parts by wt |
| Water | 75 parts by wt |

To this formulation was added 0.24 parts per weight of the thickening agent. The formulation thickened evenly and full viscosity was achieved within five minutes.

Comparative Test C

To the formulation described in Example 5 was added 0.24 parts by weight of Cellobond HEC 100'000A. Although the formulation was thickened, lumps were also formed creating a visible non-homogeneity.

I claim:

1. A thickening agent which can be used to thicken acid, neutral or alkaline media characterised in that the thickening agent essentially consists of a mixture of
   (1) a cellulose ether
   (2) a solid organic acid selected from the group consisting of citric acid, tartaric acid, oxalic acid, malonic acid, and succinic acid.

2. A process for the thickening of carpet backing compounds which process comprises adding to the carpet backing compound sufficient thickening agent as claimed in claim 1 to produce a thickened product of desired viscosity.

3. A process for the thickening of drilling muds which process comprises adding to the drilling mud sufficient thickening agent as claimed in claim 1 to produce a thickened product of desired viscosity.

4. A process for the thickening of paint formulation which process comprises adding to the paint formulation thickening agent as claimed in claim 1.

5. A composition essentially consisting of a latex dispersed in an aqueous alkaline-medium and a thickening agent composition essentially consisting of a cellulose ether and a solid organic said selected from the group consisting of citric acid, tartaric acid, oxalic acid, malonic acid, and succinic acid and
   said thickening agent composition being present in an amount sufficient to enhance the viscosity of said alkaline medium without lump formation,
   said organic acid being a solid in the thickening agent composition but said organic acid dissolving in the medium to be thickened.

6. A composition as claimed in claim 5 wherein said alkaline medium is a carpet latice, drilling mud, or pigment grind.

7. A composition as claimed in claim 5 wherein said alkaline medium is a carpet backing formulation.

8. A composition as claimed in claim 5 wherein said alkaline medium is a drilling mud.

9. A composition as claimed in claim 5 wherein said alkaline medium is a paint formulation.

10. A process for enhancing the viscosity of an alkaline medium which essentially consists of adding a mixture of a cellulose ether and a solid organic acid to said alkaline medium in an amount sufficient to thicken said alkaline medium without lump formation,
    said solid organic acid being selected from the group consisting of citric acid, tartaric acid, oxalic acid, malonic acid, and succinic acid.

11. A composition essentially consisting of a latex dispersed in an aqueous alkaline-medium having a pH of at least 9 and
    a thickening agent composition essentially consisting of cellulose ether and a solid organic acid, said thickening agent composition being present in an amount sufficient to enhance the viscosity of said alkaline medium without lump formation.

12. A process for enhancing the viscosity of an alkaline medium having a pH of at least 9, essentially consists of adding a mixture of a cellulose ether and a solid organic acid to said alkaline medium having a pH of at least 9, in an amount sufficient to thicken said alkaline medium without lump formation.

* * * * *